(No Model.) 2 Sheets—Sheet 1.

P. R. GILBERT.
CLUTCHING, REVERSING, AND SPEED CHANGING DEVICE FOR SHAFTS AND PULLEYS.

No. 469,468. Patented Feb. 23, 1892.

Witnesses:
A. V. Groupe
R. Schleicher.

Inventor:
Perry R. Gilbert
by his Attorneys
Howson & Howson (No Model.)

2 Sheets—Sheet 2.

P. R. GILBERT.
CLUTCHING, REVERSING, AND SPEED CHANGING DEVICE FOR SHAFTS AND PULLEYS.

No. 469,468.

Patented Feb. 23, 1892.

Witnesses:
A. V. Groupe
R. Schleicher.

Inventor:
Perry R. Gilbert
by his Attorneys
Howard & Howson

UNITED STATES PATENT OFFICE.

PERRY R. GILBERT, OF CHAMBERSBURG, PENNSYLVANIA, ASSIGNOR OF ONE-HALF TO AUGUSTUS WOLF, OF SAME PLACE.

CLUTCHING, REVERSING, AND SPEED-CHANGING DEVICE FOR SHAFTS AND PULLEYS.

SPECIFICATION forming part of Letters Patent No. 469,468, dated February 23, 1892.

Application filed December 26, 1891. Serial No. 416,132. (No model.)

*To all whom it may concern:*

Be it known that I, PERRY R. GILBERT, a citizen of the United States, and a resident of Chambersburg, Franklin county, Pennsylvania, have invented certain Improvements in Clutching, Reversing, and Speed-Changing Devices for Shafts and Pulleys, of which the following is a specification.

The object of my invention is to construct an extremely compact and simple form of device for clutching a wheel or pulley to or releasing it from a shaft and for reversing the direction of movement of the shaft and changing the speed of the same, the device being applicable to various classes of machinery—such as lathes, planing-machines, and the like—as a substitute for the straight and crossed belts and double sets of pulleys ordinarily used for the purpose.

Figure 1:
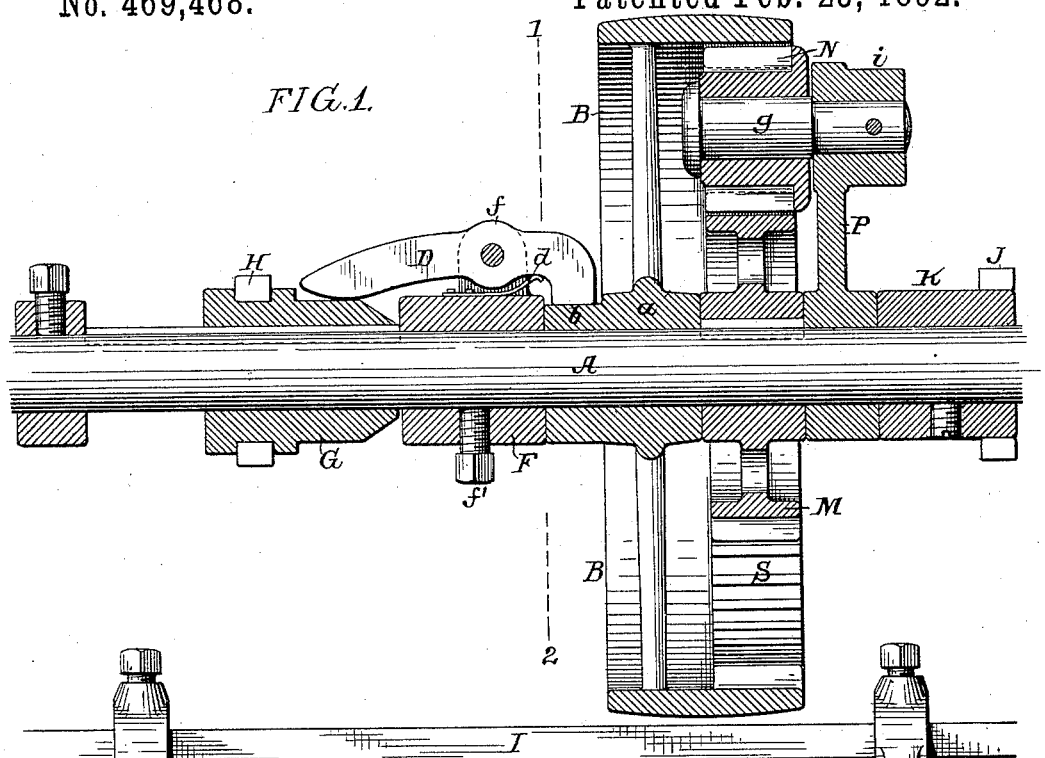
Figure 2:
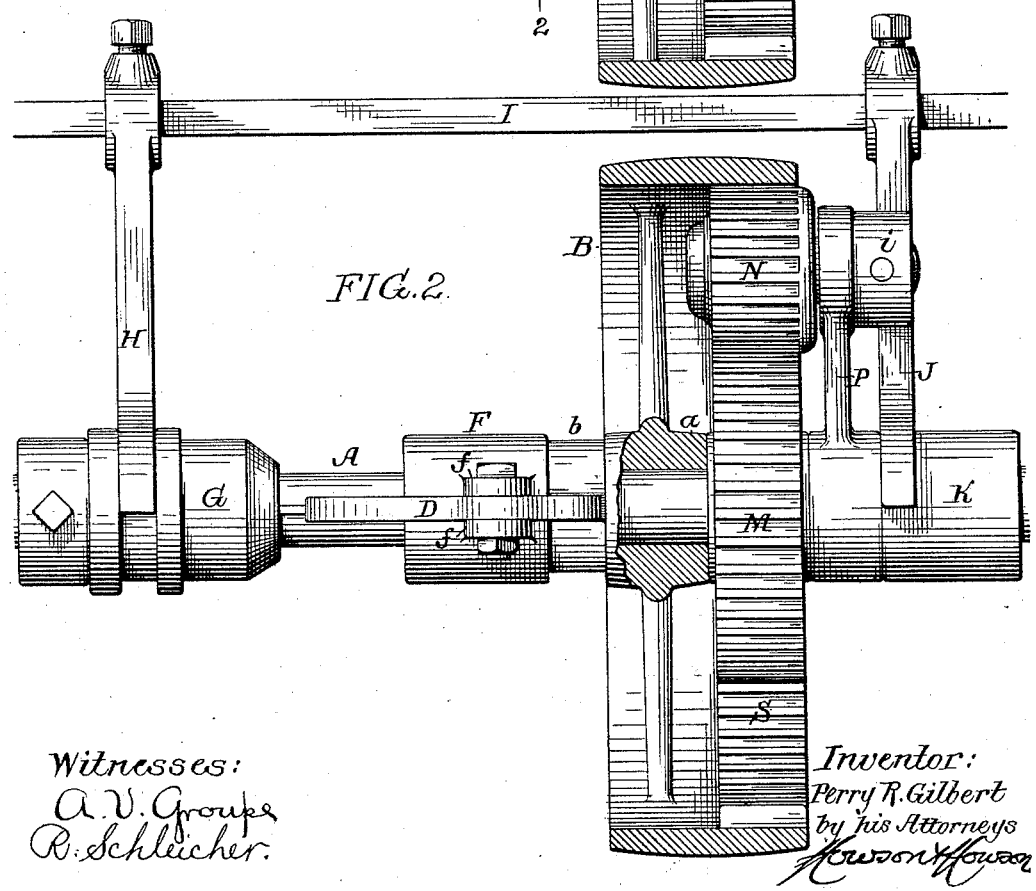

In the accompanying drawings, Figure 1 is a vertical sectional view of my improved clutching, reversing, and speed-changing device applied to a shaft. Fig. 2 is a plan view of the same, partly in section; and Fig. 3 is a transverse section on the line 1 2, Fig. 1.

A represents a shaft on which is loosely mounted a wheel or pulley B, which may receive a belt from any adjacent pulley when it serves as a means of driving the shaft A, or it may be driven from said shaft A, as the case may be, my improved mechanism being available for use under either condition of working. The hub $a$ of the wheel or pulley B has a cam portion $b$, as shown in Fig. 3, and upon this cam portion of the hub is adapted to bear one arm of the lever D, which is hung to lugs $f$ on a collar F, the latter being secured by means of a set-screw $f'$ to the shaft A.

Figure 3:
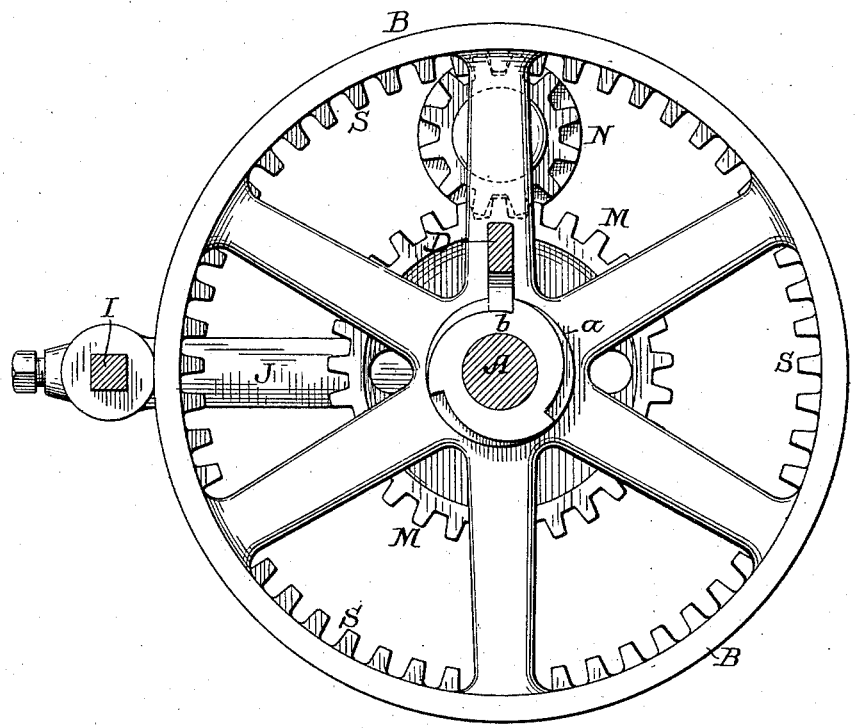

Free to slide on the shaft A, but splined thereto in the present instance so as to turn with the shaft, is a cone-sleeve G, which when projected to the position shown in Fig. 1 will raise the long arm of the lever D and will cause the other arm of said lever to bear upon the cam portion $b$ of the hub $a$, and thus engage with one of the shoulders of the same so as to clutch the wheel B to the shaft A; but when this cone-sleeve is retracted, as shown in Fig. 3, the lever D is free from the influence of said sleeve, and the short arm of the same is then lifted by means of a spring $d$, so as to be free from driving engagement with the hub $a$. Hence the wheel B is free to turn loosely on the shaft A.

The cone-sleeve G is grooved, as usual, for engagement with a forked arm H, whereby it may be moved to and fro on the shaft A, and said arm H is carried by the shifter-bar I, which may be suitably mounted and provided with any appropriate means for imparting longitudinal movement to it. Said shifter-rod I is also provided with another arm J, similar to the arm H, the forked inner end of this arm J, however, simply embracing a collar K, secured to the shaft A, this collar serving as a support for the inner end of said arm J.

Keyed or otherwise rigidly secured to the shaft A, adjacent to the hub $a$ of the wheel B, is a spur-wheel M, which meshes with a spur-pinion N, hung to a stud $g$, secured to the outer portion of an arm P, which is loosely hung to the shaft A and is confined longitudinally thereon between the hub of the spur-wheel M and the collar K on the shaft. The spur-pinion N also meshes with an internal spur-gear S, formed within the wheel or pulley B. Hence when said pulley B is clutched to the shaft by means of the lever D the arm P and the pinion carried thereby rotate with the pulley and spur-wheel M, there being no movement of rotation of the spur-pinion N on the pin G. When, however, it is desired to reverse the direction of movement of the shaft A or pulley B, and at the same time to change the speed of the same, the bar I is reciprocated so as to release the lever D from the control of the cone-sleeve G and at the same time bring the arm J into position for engagement with a boss or projection $i$ at the outer end of the arm P, as shown in Fig. 2. When the parts are in this position, the arm is prevented from rotating around the shaft A by reason of the aforesaid engagement of the arm J and boss $i$. Hence the pinion N is caused to turn upon the stud $g$, thereby either transmitting the movement of the pulley B to the spur-wheel M and increasing the speed of the shaft A as well as reversing the direction of its movement, or the spur-wheel M, through the medium of the pinion N and internal rack S, driving the pulley B in a direction the reverse of that of the shaft and at a lower speed, these two conditions of working depending upon whether the shaft or the pulley is the driver.

When it is desired to permit the pulley B to run loosely on the shaft, the bar I is adjusted to a position intermediate of the two extremes, (shown in Figs. 1 and 2)—that is to say, so as to release the lever D from the control of the cone-sleeve G without bringing the arm J into engagement with the boss $i$ of the arm P.

Although it is preferable to mount both of the arms H and J upon the rod I, as described, for reasons of convenience, such construction is not absolutely necessary, as the arms may be independently controlled, if desired.

The cam portion of the hub need not necessarily be shouldered, as shown, although such construction is preferred as insuring a positive drive. In the absence of the shoulders the lever pressing upon the cam or eccentric portion of the hub would jam against the same and thus insure the turning of the hub and sleeve F together.

Having thus described my invention, I claim and desire to secure by Letters Patent—

1. The combination of the shaft and a pulley loose thereon and having a hub with peripheral cam-surface, a sleeve or collar mounted upon the shaft and carrying a lever which extends in the axial line of the shaft and has one arm adapted to engage with said peripheral cam-surface on the hub of the wheel or pulley, and a sliding cone acting upon the other arm of said lever, substantially as specified.

2. The combination of a shaft, a pulley loose thereon and having an internal gear, a spur-wheel secured to the shaft, an arm loose on the shaft and carrying a pinion meshing with said spur-wheel and internal gear, and an arm movable into and out of engagement with said pinion-carrying arm so as to lock or release the same, substantially as specified.

3. The combination of a shaft, a pulley loose thereon and having an internal gear, a spur-wheel secured to the shaft, an arm loose on the shaft and carrying a pinion meshing with said spur-wheel and internal gear, means for clutching the pulley directly to the shaft, and means for locking and releasing the pinion-carrying arm, whereby the pulley and shaft may be driven directly one by the other or indirectly through the medium of the spur gears and pinion, substantially as specified.

4. The combination of a shaft, a pulley loose thereon and having an internal gear, a spur-wheel secured to the shaft, a pinion meshing with said spur wheel and gear, an arm loose on the shaft and carrying said pinion, mechanism for clutching the pulley directly to the shaft, an arm for operating said clutch mechanism, an arm for engaging with or releasing the pinion-carrying arm, and a bar carrying both the clutch-operating arm and the locking and releasing arm and providing for their simultaneous movement in one direction or the other, substantially as specified.

In testimony whereof I have signed my name to this specification in the presence of two subscribing witnesses.

PERRY R. GILBERT.

Witnesses:
ISAAC LESHER,
D. K. WUNDERLICH.